UNITED STATES PATENT OFFICE 2,287,891

PRODUCTION OF HYDROCARBONS AND THEIR DERIVATIVES FROM MIXTURES OF HYDROGEN AND OXIDES OF CARBON

Eduard Linckh, Ludwigshafen-on-the-Rhine, Germany, assignor, by mesne assignments, to Standard Catalytic Company, a corporation of Delaware No Drawing. Application March 17, 1938, Serial No. 196,364. In Germany November 14, 1935

7 Claims. (Cl. 260—449)

The present invention is a continuation-in-part of the invention forming the subject-matter of my copending application Ser. No. 110,666, filed November 13, 1936, which relates to the production of hydrocarbons and their derivatives from mixtures of hydrogen with oxides of carbons, in particular carbon monoxide, and in which is claimed the use as catalysts in the said conversion of substances obtained by treating fused ferrosoferric oxide with reducing gases at temperatures above 300° C.

It is the development of this process, in particular by the use of catalysts, of the said type, improved by the addition of activating substances, with which the present invention is concerned.

It has already been proposed to react carbon monoxide with hydrogen at elevated temperature and under ordinary pressure in the presence of iron or substances containing iron as catalysts, whereby paraffin hydrocarbons are mainly formed. According to another process in which the said initial materials are reacted under increased pressure, hydrocarbon derivatives containing oxygen, in particular alcohols, or also aldehydes, ketones, organic acids and the like are mainly obtained. The catalysts employed for this process are generally speaking readily friable and greatly sensitive to mechanical strain.

I have now found that the formation of hydrocarbons containing more than one carbon atom in the molecule, in particular liquid hydrocarbons, or of liquid or solid oxygen-containing derivatives of hydrocarbons from mixtures of carbon monoxide and hydrogen proceeds with very good yields not only at atmospheric pressure but also, contrary to expectation, at increased pressure by carrying out the reaction at elevated temperature in the presence of catalysts which have been obtained by the treatment of fused ferrosoferric oxide with reducing gases, advantageously with hydrogen or gases containing hydrogen, at temperatures above 300° C. and which preferably contain activating additions. It has been found that titanium and silicon are particularly suitable as activating additions. The catalysts thus prepared are very hard and solid and have a very good activity. The fused ferrosoferric oxide used for their preparation is preferably obtained by fusing metallic iron (which is advantageously in a comminuted state, as for example in the form of powder or of chips) in a current of oxygen. But the said oxide may also be prepared from any desired iron compound which is capable of yielding by fusing or by the subsequent cooling a melt consisting of or containing ferrosoferric oxide; as such compounds come in particular into consideration ferrosoferric oxide itself or ordinary iron oxide from which at the melting temperatures oxygen is set free, or the substance often called ferrous oxide which is not existent as an individual compound under ordinary conditions but represents a mixture of ferrosoferric oxide and metallic iron (see Handbuch der Anorganischen Chemie by Gmelin, Volume on Iron, part B, page 26). The products obtained with these catalysts consist mainly of hydrocarbons, especially those of an unsaturated nature, and usually contain only small amounts of substances containing oxygen; but the conversion may also be directed in such a manner that larger amounts of oxygen-containing compounds are formed, for example by the use of initial gases containing comparatively large amounts of hydrogen. These compounds are alcohols, such as methanol or isobutylalcohol, aldehydes, ketones and acids of the type usually found as oxygen-containing constituents in the products resulting from the interaction of carbon monoxide with hydrogen.

The said catalysts have a specially high activity when they are prepared while using activating additions. As already stated, titanium and silicon or their compounds have a particularly strong activating action for the present purpose. Examples of the said silicon compounds are silicon dioxide (pure or in the form of sand), the silicates of sodium, potassium and calcium, sodium silicofluoride, ferrosilicon, silicon carbide, the silicides of the metals and silicon tetrachloride; examples of suitable compounds of titanium are titanium dioxide, titanium oxide, the titanates of calcium, sodium and potassium, titanium sulphate, titanium chloride, the titanium fluorides of potassium, sodium and calcium, fluo-titanium oxide, titanium carbide, ferrotitanium and the titanides of metals. Other good activating additions are uranium, manganese, tungsten, chromium and molybdenum and their compounds, as well as copper and silver and their compounds, or alkali metals or alkaline earth metals, such as potassium, calcium, magnesium and barium, and their compounds. These additions may all be used in an amount of up to 20 per cent with reference to the iron. Small amounts, up to about 6 per cent of nickel and cobalt and compounds of these metals are also advantageous. As compounds of the said activating metals the most various substances, as for example the oxides, the hydroxides or carbonates, such as uranium oxide or chromium hydroxide or calcium carbonate, or the halides or phosphates may be employed.

Catalysts which contain two or more of the said metals (in most cases in the form of their compounds) have an especially favorable action. Of these, those are advantageous which contain compounds of titanium or silicon or both of the said elements together. Generally speaking the catalyst contains besides iron a suitable amount, up to 20 per cent, of silicon or titanium or both elements in the form of their compounds, also a compound of heavy metal other than iron and an alkali metal compound, in particular a compound of potassium; they advantageously also contain an alkaline earth metal compound and, if desired, a small amount of cobalt or nickel or their compounds as a further addition. A small addition of tin or lead or their compounds counteracts very well the deposition of carbon in the catalysts. A moistening of the mass before fusion effects an increase in the activity in many cases.

The method of preparing the catalysts is simple and is preferably effected by mixing the iron powder or chips with the activating additions, transferring the mixture to a suitable crucible, preferably into a double-walled water-cooled iron crucible, igniting a piece of paper or wood therein and then immediately blowing thereon a strong current of oxygen. By reason of the great heat of reaction of the combustion of the iron with oxygen, the mass becomes incandescent until almost all the iron has been converted into the ferrosoferric oxide.

The fused ferrosoferric oxide containing the said activating additions is treated with reducing gases before use, in particular with hydrogen or with gaseous hydrocarbons, such as methane or ethane either in the furnace in which the reaction with the gases containing carbon monoxide is to be carried out or in a special apparatus. In many cases it is advantageous to add ammonia to the reducing gas. The treatment with the reducing gases may be carried out at ordinary or increased pressure (for example 5 or 20 or 50 atmospheres, and preferably of the range of 100 or 200 atmospheres or still higher). At ordinary pressure the temperature is comparatively high, usually between 450° and 850° C., while at increased pressure it usually is between about 400° and 850° C. but may be as low as 300° C.

The products obtained according to this invention by the treatment of the mixtures of hydrogen and carbon monoxide contain, in addition to carbon dioxide, a little water and small amounts of oxygen-containing hydrocarbon derivatives, mainly hydrocarbons which are for the greater part unsaturated and for the lesser part saturated. These hydrocarbons are mainly of an aliphatic nature.

It is preferable during the reaction of the hydrogen with the carbon monoxide in the presence of the said catalysts to lead away the heat of reaction rapidly because otherwise the catalysts may be overheated to the point at which they sinter together. The reaction temperature ranges between 150° and 500° C. and advantageously between about 275° or 300° and 425° C., and the pressure is preferably above 50 atmospheres, advantageously between 100 and 250 atmospheres. Atmospheric pressure may, however, also be used as already described. The ratio of the amounts of carbon monoxide and hydrogen in the initial gases may be very different. Suitable ratios are for example from 1 to 3 parts of hydrogen with from 3 to 1 parts respectively of carbon monoxide. The preferred ratios are from 4 to 6 parts of hydrogen with from 6 to 4 parts respectively of carbon monoxide.

The following examples will further illustrate the nature of this invention but the invention is not restricted to these examples.

*Example 1*

1000 grams of iron powder obtained by the decomposition of iron carbonyl, 50 grams of uranyl nitrate and 50 grams of titanium dioxide are fused in a water-cooled iron crucible by means of oxygen. After cooling the melt constitutes a solid and hard mass. It is broken up into grains having a size of from 5 to 10 millimeters and treated at 460° C. with hydrogen. 330 cubic centimeters of the catalyst thus obtained are spread out in a layer of from about 1 to 2 centimeters in thickness between two flat heating spirals of copper tube in a high-pressure furnace and a gas mixture containing about 50 per cent of carbon monoxide and 50 per cent of hydrogen is led through the catalyst downwards. The superheated steam for the heating and for the withdrawal of the heat of reaction is led through the heating spirals. In the catalyst chamber, a pressure of from 75 to 80 atmospheres and a temperature of from 370° to 410° C. is maintained; the gas flows through the chamber at a speed of 300 liters per hour (calculated with reference to the final gas). The final gas contains per liter on an average 73 cubic centimeters of liquid oil and 157 cubic centimeters of hydrocarbons capable of condensation at atmospheric pressure at 80° below zero C. and being, similarly to the oil, mainly of an olefinic nature. The oil obtained still contains 2.3 per cent of oxygen; it has an iodine value of 110. The composition of the final gas after the condensation of the fraction which liquefies at ordinary temperature is:

|  | Per cent by volume |
|---|---|
| $CO_2$ | 38.3 |
| $C_nH_{2n}$ ($n$ being more than 2) | 5.1 |
| $CO$ | 18.4 |
| $H_2$ | 24.0 |
| $C_nH_{2n+2}$ (average value of $n$ being 1.3) | 10.2 |
| $N_2$ | 3.7 |

About 5 per cent of alcohols are contained in the aqueous fraction of the liquid product which amounts to 71 cubic centimeters per cubic meter of final gas.

*Example 2*

1000 grams of iron powder, 5 grams of titanium dioxide, 5 grams of uranyl nitrate and 10 grams of calcium oxide are fused in a current of oxygen in a water-cooled iron crucible. After cooling, the resulting melt is comminuted, treated at 460° C. with hydrogen, oxidized with air at the same temperature and then again treated with hydrogen at the same temperature.

1075 cubic centimeters of the resulting catalyst are placed in eight layers, each of 4 centimeters thickness, within a high-pressure furnace of 100 millimeters internal diameter on a heating coil through which superheated steam is forced. A mixed gas containing from 47 to 50 per cent of carbon monoxide and from 53 to 50 per cent of hydrogen is led in such an amount at from 380° to 410° C. under a pressure of from 50 to 100 atmospheres through the furnace that 500 liters of final gas per hour are obtained. There are thus obtained from 50 to 70 grams of oil, 60 to 90 grams of hydrocarbons of low boiling point and 100 grams of water per cubic meter of final gas. The oil contains from 0.11 to 0.5 per cent of oxygen and has a saponification value of from 1.9 to 4.5 and an iodine value of 155. The hydrocarbons of low boiling point consists mainly of olefines containing from 3 to 5 carbon atoms.

Example 3

1000 grams of iron powder are mixed with 50 grams of silicon powder, 50 grams of tungstic oxide, 1 gram of nickel oxide, 50 grams of potassium hydroxide and 50 grams of water, the mixture then being fused in a current of oxygen. The melt is cooled and comminuted and then treated at 650° C. with a mixture of 2 parts of hydrogen and 1 part of ammonia.

The catalyst thus obtained is charged as a layer 250 millimeters in length into a high-pressure tube 500 millimeters long and 16 millimeters in internal diameter. A gas mixture containing 34 per cent of carbon monoxide and 66 per cent of hydrogen is then led through at a temperature of from 350° to 400° C. under a pressure of from 110 to 150 atmospheres. The resulting final gas is obtained in an amount of 10 liters per hour. It has the following composition:

| | Per cent by volume |
|---|---|
| $CO_2$ | 23.0 |
| $C_nH_{2n}$ ($n$ being more than 2) | 4.4 |
| CO | 2.6 |
| $H_2$ | 47.0 |
| $CH_4$ | 19.0 |
| $N_2$ | 4.0 |

1 cubic meter of final gas contains 360 cubic centimeters of oil and hydrocarbons of low boiling point and 54 cubic centimeters of water.

What I claim is:

1. A process for the conversion of mixtures of carbon monoxide and hydrogen into hydrocarbons containing more than one carbon atom in the molecule which comprises contacting such mixture at a temperature between 150 and 500° C. with a catalyst obtained by treating fused ferrosoferric oxide with a reducing gas at a temperature between about 300 and about 850° C.

2. A process for the conversion of mixtures of carbon monoxide and hydrogen into hydrocarbons containing more than one carbon atom in the molecule which comprises contacting such mixture at a temperature between 150 and 500° C. with a catalyst obtained by treating fused ferrosoferric oxide containing a substance selected from the group consisting of compounds of titanium and silicon with a reducing gas at a temperature between about 300 and about 850° C.

3. A process for the conversion of mixtures of carbon monoxide and hydrogen into hydrocarbons containing more than one carbon atom in the molecule which comprises contacting such mixture at a temperature between 150 and 500° C. with a catalyst obtained by treating with a reducing gas at a temperature between about 300 and about 850° C. fused ferrosoferric oxide containing a substance selected from the group consisting of compounds of titanium and silicon, and, besides, a substance essentially comprising a compound selected from the group consisting of oxides, hydroxides, carbonates, halides and phosphates of a heavy metal other than titanium from the group consisting of uranium, manganese, tungsten, chromium, molybdenum, copper and silver.

4. A process for the conversion of mixtures of carbon monoxide and hydrogen into hydrocarbons containing more than one carbon atom in the molecule which comprises contacting such mixture at a temperature between 150 and 500° C. with a catalyst obtained by treating with a reducing gas at a temperature between about 300 and about 850° C. fused ferrosoferric oxide containing a substance selected from the group consisting of compounds of titanium and silicon, further a substance essentially comprising a compound selected from the group consisting of oxides, hydroxides, carbonates, halides and phosphates of a metal selected from the group consisting of uranium, manganese, tungsten, chromium, molybdenum, copper and silver, and, in addition, a compound selected from the class consisting of the alkali and alkaline earth metals.

5. The process as claimed in claim 4 in which the alkali metal is potassium.

6. In the process as claimed in claim 1, contacting the mixture of carbon monoxide and hydrogen with the catalyst under a pressure above 50 atmospheres and at a temperature between 275° and 425° C.

7. In the process as claimed in claim 1, operating with a catalyst obtained by treating fused ferrosoferric oxide with hydrogen at a temperature between 400° and 850° C.

EDUARD LINCKH.